United States Patent [19]

De Laporte

[11] Patent Number: 4,971,809

[45] Date of Patent: Nov. 20, 1990

[54] PROCEDURE FOR THE MANUFACTURING OF A BASE MATERIAL FOR CATTLE FEED AND BASE MATERIAL MANUFACTURED ACCORDING TO THIS PROCEDURE

[75] Inventor: André De Laporte, De Pinte, Belgium

[73] Assignee: "Amylum" naamloze vennootschap, Brussels, Belgium

[21] Appl. No.: 353,362

[22] Filed: May 17, 1989

[30] Foreign Application Priority Data

May 18, 1988 [BE] Belgium .................... 08800551

[51] Int. Cl.$^5$ ................................ A23K 1/00
[52] U.S. Cl. ........................ 426/31; 426/53; 426/520; 426/623; 426/807
[58] Field of Search ............ 426/31, 53, 54, 623, 426/630, 807

[56] References Cited

U.S. PATENT DOCUMENTS

| | | | |
|---|---|---|---|
| 4,055,666 | 10/1977 | Jeffreys et al. | 426/31 |
| 4,233,406 | 11/1980 | Wieg et al. | 426/53 |
| 4,247,561 | 1/1981 | Nelson | 426/53 |
| 4,302,475 | 11/1981 | Shigehiro | 426/53 |

FOREIGN PATENT DOCUMENTS 1366095 9/1974 United Kingdom .

OTHER PUBLICATIONS

Chemical Abstracts vol. 84, 1976, p. 336 and JP 49-44392.
Chemical Abstracts vol. 96, 1982, p. 332 and JP 56-31146.
Starch/Stärke 36 (1984) Nr. 1, S. 1–7, Verfahren Der Industriellen Weizenstärke-Gewinnung Auf Rohstoffbasis Weizenkorn by Von W. Kempf und C. Röhrmann, Detmold.
Proc. OECD Workshop on "Dietary Fibre in Monogastric Nutrition", Cornell Univ., Ithaca, NY, Aug. 3, 4, 5, 1987, Approach to the Energetic Importance of Fibre Digestion in Pigs.
Proceedings of the 3rd International Seminar on Digestive Physiology in the Pig Copenhagen May 16–18th 1985. No. 580 Beretning Fra Statens Husdyrbrugsforsog.

*Primary Examiner*—R. B. Penland
*Attorney, Agent, or Firm*—Foley & Lardner, Schwartz, Jeffery, Schwaab, Mack, Blumenthal & Evans

[57] ABSTRACT

Preparation according to which preparation a feed slurry and an effluent are obtained. The effluent is subjected to a thermal treatment in which resident proteins coagulate, the high protein solid components are removed and the effluent is. The evaporated feed slurry is thereupon hydrolyzed and said feed slurry is mixed with the effluent. Prior or after mixing the effluent, the mixture, is subjected to a lactic acid fermentation. After fermentation and mixing the mixture is further evaporated to a dry material content of 45 to 55 weight %.

23 Claims, No Drawings

4,971,809

PROCEDURE FOR THE MANUFACTURING OF A BASE MATERIAL FOR CATTLE FEED AND BASE MATERIAL MANUFACTURED ACCORDING TO THIS PROCEDURE

The invention concerns a process for the manufacturing of a base material for cattle feed, from at least one of the waste products of a wheatmeal starch preparation according to which preparation one obtains a liquid evaporated residue flow, i.e. feed slurry, and a diluted, remaining waste flow, i.e. effluent. In the inventive process, the effluent is subjected to a thermal treatment in which the resident proteins coagulate, the protein rich solid elements are removed and the remaining effluent stream is evaporated to subsequently be processed into a base material for cattle feed.

The starch preparation out of wheat can be done in different ways, a number of them being described in Stärke 36 (1984) no. 1, pages 1–7.

During a possible wheatmeal starch preparation the wheat is ground to meal from which, after purification, flour and side products such as the germs, pollard, short meal, and offal are obtained.

When flour is separated into starch and gluten a liquid sideflow develops during the subsequent purification of these elements, containing, besides starch as main component, also, among others, proteins, fibres, pentosans, sugars, fats and ashes.

During recovery of starch from the sideflow a diluted flow develops which, after concentration, is separated into an evaporated residue flow with a dry material content of 10 to 25 weight %, called feed slurry and a diluted remaining waste flow, called effluent with a dry material content of 2 to 4 weight %.

A process of the aforementioned kind in which, starting with the effluent, a base material for cattle feed is obtained, is known in EP-B-O No. 001 470.

According to this process the effluent is subjected to a thermal treatment, the high protein solid elements are separated and, after the treatment with hemicellulases, are evaporated to achieve a dry material content of 35 to 45 weight %. An additional treatment with (alpha)-amylase and gluco-amylase allows a concentration of the remaining waste flow to a dry material content of 70 weight %. After drying a base product suitable for cattle feed is obtained.

Such a procedure is mainly directed to the treatment of the effluent of the wheatmeal starch preparation in order to relieve the waste water in the wheatmeal starch industry. Moreover, as a side product a component is obtained which can be used for cattle feeding but which only possesses a relatively small nutritional value. Due to numerous enzymatic treatments and the high cost of energy per kilogram of end product such a procedure is uneconomical for the manufacturing of a cattle feed component.

SUMMARY OF THE INVENTION

Accordingly, it is an object of the present invention to provide a process for manufacturing a base material for cattle feed, starting with at least one of the residue products of a wheatmeal starch preparation, which can be carried out at relatively low cost.

Another object of the present invention is to provide a process which produces a base material for a cattle feed which can easily be warehoused, preserved and handled, which has a high nutritional value, and which is easily digestible.

A further object of the present invention is to provide a base material for a cattle feed produced by the inventive process.

In accomplishing the foregoing objectives, there has been provided, in accordance with one aspect of the present invention, a process for manufacturing a base material for cattle feed, starting with at least one of the residue products of a wheatmeal starch preparation according to which preparation a feed slurry and an effluent are obtained, which comprises the steps of: subjecting the effluent to a thermal treatment in which resident proteins coagulate, high protein solid components are removed and the remaining effluent is evaporated to produce an evaporated remaining effluent; hydrolyzing the feed slurry; preparing a mixture from the hydrolyzed feed slurry and the evaporated remaining effluent; subjecting the mixture to a lactic acid fermentation; and evaporating the fermented mixture. Preferably the mixture is evaporated to a dry material content of 45 to 55 wt %.

In accordance with another aspect of the present invention, there is provided a process as characterized above, which comprises the steps of subjecting the effluent to a thermal treatment as described above; subjecting the evaporated remaining effluent to a lactic acid fermentation; hydrolyzing the feed slurry; preparing a mixture from the hydrolyzed feed slurry and the fermented evaporated remaining effluent; and evaporating the mixture.

Also in accordance with the present invention, there are provided base materials for cattle feed produced by the foregoing processes.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

This process not only allows for valorization of the effluent as base material for cattle feed but also of the feed slurry which, even though it can serve as base material for cattle feed, still brings a lot of problems along, among others in transport, preservation, marketability, storage possibilities, nutritional value and the great risk of unwanted fermentations.

By treating both liquid residue products according to the present process and, more particularly, by subjecting the effluent or its mixture with the feed slurry to a lactic acid fermentation, the mixture of the liquid residue products can be evaporated to a sufficient extent, the nutritional value, digestibility and preservability increase and with a possible addition of dry residue products such as pollard, short meal and offal a homogeneous byproduct can be obtained avoiding clot formation at the same time.

Without lactic acid fermentation no sufficiently strong concentration can be obtained as, in this case, the viscosity of the liquids increases rapidly during concentration, heat transfer is hampered and precipitation is deposited in the evaporators. Even when sufficiently strong concentration is achieved with difficulty, a homogeneous mixture with possible added dry, vegetable residue products cannot be obtained due to the stickiness of the mixture resulting in clot formation. Further concentrating of this product is then difficult and must occur during a relatively long period at high temperatures which adversely affects nutritional value and digestibility.

Applying lactic acid fermentation in the preparation of a cattle feed is known as such, a.o. in EP-B-162 805. This patent publication describes a preparation based on humid, germinated grains over which lactic acid bacteria are being spread.

In DE-A-3 043 083 one starts off with barley which is subjected to lactic acid fermentation after malting in which a cattle feed additive is obtained.

GB-A-1 366 095 describes a procedure to treat cereals in such a way that these can be digested by young animals whose digestive system is not fully developed, as well.

In a possible procedure according to this patent the cereal is first ground, the ground cereal is then dispersed in a liquid such as, for instance, water or also residue liquids of the starch industry and preferably performing a lactic acid fermentation subsequently followed by an enzymatic hydrolysis after where the aggregate is dried.

Liquids originating from the starch industry operate in this procedure only as a medium in which lactic acid fermentation and hydrolysis of ground cereals occur. This procedure is not suitable to produce, starting off only from residue products of the starch preparation as cheap base materials, a valuable base material for cattle feeding.

The major disadvantage of cattle feed components known from the aforementioned patent publications is that they are expensive as one takes an expensive base material which, as such, already is a valuable base material for cattle feeding as the starting point.

In a particular embodiment of the invention the mixture is evaporated after fermentation and mixing to a dry material content of 45 to 55 weight %.

In a noteworthy embodiment of the present invention the effluent is hydrolyzed prior to proceeding with a lactic acid fermentation.

Hydrolysis of the feed slurry as well as that of the effluent can be achieved via enzymatic hydrolysis or via acid hydrolysis which encompasses an acidification up to a pH of practically 1.7 and a liquefaction at temperatures between 140° and 160° C.

In a effective embodiment of the present invention the lactic fermentation is applied during at least one hour under micro-aerophile conditions and at temperatures varying between 30° and 60° C.

Preferably this fermentation will be applied at 45° to 55° C. during 4 to 48 hours.

In a practical embodiment of present invention dry vegetable by-products are added to the obtained product. These by-products do not necessarily have to originate from a wheatmeal starch preparation.

Some dry, vegetable by-products such as, for instance, the by-products pollard, short meal and offal of a wheatmeal starch preparation can, as such, be utilized as a cattle feed component. The latter however, possess a relatively low nutritional value and marketability and transport their is difficult due to its low bulk weight.

In a possible embodiment of the present invention the obtained product is dried.

In an effective embodiment the obtained product is preferably dried to a dry material content between 88 and 92 weight %.

During the addition of dry by-products the procedure according to the invention avoids clot forming resulting in faster drying or drying at a lower temperature without humid cores remaining locally. This results in a reduced risk in the formation of Maillard products which are detrimental to the digestibility of the base material. In addition, it is not necessary to finely grind the product to avoid homogeneous distribution of clotted material with humidity in order to thus minimize the risk of bacterial infection.

The invention also concerns a base material produced for cattle feeding according to the procedure in one of the aforementioned embodiments.

The obtained base material can be combined with other products in order to obtain an appropriate feed composition in this manner.

According to the subject procedure, starting off with liquid residue products in the wheatmeal starch preparation a base material for cattle feeding can be produced, possibly after the addition of dry vegetable by-products such base material being fit to be dried in order to improve storage life.

The invention mainly concerns a base material for cattle feeding characterized in that it contains dry, vegetable by-products and that it contains, calculated on dry material, at least 1 weight % lactic acid and 10 to 15 weight % mono-, di- and trisaccharides.

Surprisingly, it has been found that the base material according to the invention possesses better feed conversion and better digestibility than an habitual mixture of the various residue products which have been evaporated and dried uneconomically and with many problems. Such a mixture is named wheat gluten feed hereafter. Moreover, with a cattle feed including the base material according to the invention, an increased growing speed of the animals has been established and a better meat quality has been obtained.

Other particularities and advantages of the present invention will appear from the following description of a procedure for the manufacturing of a base material for cattle feeding and of a base material produced according to this procedure; this description is only given as an example and does not limit the invention.

The following has to be observed for the preparation of a base material for the cattle feeding according to the invention.

The residue waste flow, so-called effluent, obtained from the starch preparation, are is evaporated. The effluent has the following composition, weight percentages:

| | |
|---|---|
| dry material | 2–4% |
| and calculated on the quantity of dry material: | |
| maltose | 25–45% |
| other mono- and dissaccharides | 15–20% |
| lactic acid | 2–6% |
| acetic acid | 0.5–1.5% |
| protein | 13–18% |

By a thermal process a portion of the resident proteins is coagulated followed by a separation of high protein, solid components. The remaining liquid flow can only be further evaporated to 20 to 25 weight % dry material if no additional measures such as described hereafter are taken. Concentrating to higher concentrations of dry material leads to problems during additional concentration due to the high viscosity and the deposit of precipitations on the heating elements of the evaporators due to which the heat transfer is strongly reduced and the risk of process interruption increases.

After thermocoagulation of proteins and the removal of them, corn steeping water still containing live lactobacilli is added to the remaining waste flow, in which the lactic acid fermentation starts. Other sources of lactic acid bacteria can be utilized for this.

If a lactic acid fermented residue flow is already available, the aforementioned waste flow can be inoculated with it.

The lactic acid fermentation is processed during at least one hour under micro-aerophile conditions at temperatures between 30° and 60° C., with or without neutralization of the produced acid. Preferably, the fermentation will be carried out at 45° to 55° C. during 4 to 48 hours.

A protein analysis after fermentation shows that the lysine content has increased, which is important for the nutritional value of these products.

The feed slurry also obtained from the wheat starch preparation, has the following composition in weight percentages:

| dry material | 10-25% |
|---|---|
| and calculated on dry material: | |
| ashes | 1-2% |
| protein | 5-12% |
| starch | 40-60% |
| sugars | 5-15% |

It is hydrolyzed via acid jet by acidifying to pH 1.7 and subsequently liquefied at 140° to 160° C., or possibly via an enzymatic hydrolysis in which amylases, cellulases, hemicellulases, glucoamylases and β-glucanases are considered.

During acid hydrolysis starch is converted into mono-, di- and oligosaccharides. The pentosans present are hydrolyzed as well which leads to an additional viscosity reduction.

After a possible neutralization the feed slurry is mixed with fermented and evaporated, effluent and the entire mixture is evaporated to a dry material content of 45 to 55 weight %. Concentrating to higher concentrations leads here as well to deposit of product on the walls of the evaporators due to the increase in viscosity.

Per 0.8 to 1.4 kg of this concentrate, 1 kg the wheat milling by-products is added with a dry material content of 85 to 88 weight % in which the dry material content of the mixture is between 64 and 72 weight %. The mixture of pollard, short meal and offal has the following composition in weight percentages:

| dry material | 85-90% |
|---|---|
| and calculated on dry material: | |
| raw protein | 16-18% |
| raw cellulose | 8-9% |
| raw ashes | 5-6% |
| raw fats | 5-6% |
| starch | 25-30% |

In this way the entire production of residue products obtained during the starch and gluten preparation and the wheat grinding is utilized.

The intermediate product which is obtained in this stage of the procedure, is already fit as base material for cattle feeding. As it has not been dried, it hardly contains any Maillard products but indeed viable lactic acid bacteria.

After the drying process a base material for cattle feeding is obtained which can be stored longer and is easier to handle and possesses a dry material content of 88 to 92%. It contains, besides the components originating from pollard, short meal and offal, in addition minimum 1.0 weight % (calculated on the quantity of dry material) lactic acid, 10 to 15 weight % (calculated on the quantity of dry material) mono-, di-and trisaccharides and lactic acid bacteria. The in vitro digestibility on dry material amounts to 68% defined via the procedure published in Proc. OECD Workshop on Dietary fibre in monogastric nutrition, Cornell, Ithaca, N.Y. 1987.

The presence of limited quantites of lactic acid leads to the surprising effect that, on the one hand, higher percentages of dry material can be reached during the evaporation of the liquid mixture which allows advantageously to pass the clot forming limits and, on the other hand, clot forming is avoided at obviously higher humidity contents with respect to mixtures which were not subjected to lactic acid fermentation.

In a first variant of the procedure according to the invention, prior to the processing of lactic acid fermentation, the thermal processed, evaporated, effluent is hydrolyzed by an acid or enzymatic hydrolysis which is performed in a similar way as aforementioned for hydrolysis of the feed slurry. After this fermentation and enzymatic hydrolysis the composition is as follows in weight percentages of the fermented effluent; calculated on the amount of dry material (10%):

| maltose | 20-40% |
|---|---|
| other mono- and dissacharides | 8-14% |
| lactic acid | 15-25% |
| acetic acid | 1-3% |
| protein | 10-18% |

According to a second variant of the procedure the hydrolyzed, feed slurry is mixed with the thermally processed, effluent prior to the processing of the lactic acid fermentation. In this case the organic matter from the feed slurry as well as from the effluent are fermented.

In a third variant, the dry material mixture evaporated to 45 to 55 weight % of the evaporated residue flow and residual waste flow is dried for instance via spray drying in which it has been established that the lactic acid fermentation favourably influences the drying process by spray drying, where upon this dried product is mixed with dry waste products. This variant has the additional advantage that the content in active microorganisms in the obtained product is higher than when the mixture is being dried with other drying techniques combined with longer resting periods and/or higher drying temperatures.

The present invention will be better illustrated by means of the following example:

EXAMPLE 100 litres of the effluent of the wheat starch preparation with a dry material content of 3% and the following composition, calculated in weight percentages of the amount of dry material, is evaporated to 10 weight % of dry material.

| | |
|---|---|
| maltose | 35% |
| other mono- and disaccharides | 17.5% |
| lactic acid | 4% |
| acetic acid | 1% |
| protein | 16% |

After a thermal treatment at 90°–95° C. during 10 to 20 minutes, the high protein deposit is separated and the remaining liquid is further evaporated in a down draught evaporator up to a dry material concentration of 20 weight %. By this concentration the viscosity at 85° C. amounts to 1000 cP which is accepted as a limit value for good heat transfer and material deposits in the evaporators.

The evaporated liquid is hydrolyzed with pentosanase Biopen (R) during 4 hours at 50° C. and a pH of 4 to 5, the lactic acid fermentation is started by the inoculation of corn steeping liquid and the mixture is kept during 24 hours at 50° C. under micro aerophile conditions.

18 liters of the feed slurry with a dry material content of 13% is hydrolyzed as well by acid hydrolysis by first acidifying with sulphuric acid up to pH 1.7 and thereafter deliquescing it through an acid jet at 140° C. The composition of the feed slurry in weight percentages with respect to the dry material content is as follows:

| | |
|---|---|
| raw protein | 17% |
| raw cellulose | 8.5% |
| raw ashes | 5.5% |
| raw fats | 5.5% |
| starch | 27.5% |

After mixing the fermented effluent and the hydrolyzed feed slurry in proportion of the volumes of 0.85 to 1, the mixture is evaporated in a down draught evaporator to 48.6 weight % of dry material.

This mixture is mixed with pollard, short meal and offal with a dry material content of 87 weight % and the following composition in weight percentages, calculated on dry material

| | |
|---|---|
| protein | 14.5% |
| raw cellulose | 5.5% |
| ashes | 5% |
| Total fat | 3.6% |
| Remaining carbohydrates | 71.4% |
| in which: | |
| lower sugars | 12.5% |
| starch | 22% |
| lactic acid | 2.6% | in a mixture ratio in dry material of ½ in which the product, already being a cattle feed, has a dry material content of 68.9. After drying in a drum dryer the base material for cattle feeding with a dry material content of 90% is obtained.

From an analysis the following composition calculated in weight percentages on the quantity of dry material arose:

| | |
|---|---|
| ashes | 1.5% |
| protein | 8.5% |
| starch | 51% |
| sugars | 10% |

When no lactic acid fermentation is performed and the mixture of evaporated, hydrolyzed, effluent is evaporated with the hydrolyzed, feed slurry to 39.5% dry material, a sticky product is obtained which lead to clot formation during mixing with dry by-products. Concentrating to a higher concentration than 39.5% is quite difficult as material is deposited in this case on the walls of the evaporator.

The "in-vitro" digestibility of the dried cattle feed obtained accordingly to the procedure in this example is better than that of barley gluten feed and that of pollards which are side products of flour mills. The compared products had the following percentual composition

| | Ashes | Protein | Starch | Cellulose | Extractable fat | Lactic acid |
|---|---|---|---|---|---|---|
| Dried product according to example (I) | 5.2 | 14.5 | 22 | 5.5 | 2.6 | 2.6 |
| Barley gluten feed (II) | 4.2 | 16.0 | 23.9 | 5.3 | 2.7 | 0.7 |
| Pollard (III) | 4.5 | 17.0 | 22.6 | 7.2 | 3.4 | 0.3 |

The "in-vitro" tests for digestibility on dry material and on organic material have been performed according to the procedure published in Proc. OECD Workshop on Dietary fibre in monogastric nutrition, Cornell, Ithaca, N.Y. 1987.

The "in-vitro" tests with respect to protein digestibility have been performed according to the procedure published in Proceedings of 3rd Int. Seminar on digestive physiology in the pig, Copenhagen, 16–18 May 1985, p. 329–332. They gave the following results:

| "In vitro" digestibility on dry material in % | "In vitro" digestibility on organic material in % | "In vitro" digestibility on protein in % |
|---|---|---|
| I 71.9 | 70.2 | 83.7 |
| II 65.0 | 63.1 | 73.8 |
| III 53.8 | 53.9 | 77.7 |

The relatively high nutritional value of the dried product according to this examples appears from:

feeding tests with cattle on the one hand with feed with 20 weight % corn gluten feed and on the other hand with the same feed in which corn gluten feed was replaced with the dried product according to the example.

Tests were each performed on 26 animals, during 220 days.

The following results were obtained:

| | Feed with corn gluten without product according to the invention | Feed with product according to the invention |
|---|---|---|
| Starting weight | 282.2 kg | 270.5 kg |
| Final weight | 556.1 kg | 551.2 kg |
| Number of days | 220 | 216.6 |
| Average daily | 1.24 kg | 1.30 kg |

-continued

|  | Feed with corn gluten without product according to the invention | Feed with product according to the invention |
| --- | --- | --- |
| growth | | |
| Carcass weight | 352.1 kg | 354.8 kg |
| Carcass quality | 3.5 | 4.7 |

Feed tests were carried out during 28 days on 19 starter piglets.

The feeds had the following composition (in weight percentages) in which the second feed is composed by the first one to which all barley had been replaced by the dried product according to the example.

|  | First feed | Second feed |
| --- | --- | --- |
| Barley | 26% | — |
| Product according to example | — | 26% |
| Corn | 20% | 20% |
| Wheat | 24% | 24% |
| Soy 44 | 10% | 10% |
| Corefeed | 20% | 20% |

The following results in kilogram were obtained:

|  | First feed | Second feed |
| --- | --- | --- |
| Average starting weight | 11.3 | 12 |
| Average final weight | 24.75 | 26.55 |
| Feed assimilation/piglet/day | 1.06 | 1.07 |
| Average growth/piglet | 13.45 | 14.55 |
| Average growth/piglet/day | 0.480 | 0.520 |
| Feed usage (assimilation/growth) | 2.21 | 2.06 |

The present invention is in no way limited to the embodiments described above and within the scope of the patent application numerous alterations can be applied to the described embodiments, a.o. regarding the performance circumstances, the sequence and the number of steps used for the achievement of the invention.

Concentration occurs in various stages. The number of concentration steps, the times of concentration and the dry material content which are achieved during one concentration step, are only given as examples.

I claim:

1. A method of manufacturing a base material for cattle feed starting from a feed slurry and an effluent obtained in a wheat starch preparation process, which comprises the steps of:
   (a) subjecting the effluent to a thermal treatment in which resident proteins coagulate, high protein solid components are removed and the remaining effluent is evaporated to produce an evaporated remaining effluent;
   (b) hydrolyzing the feed slurry;
   (c) preparing a mixture from said hydrolyzed feed slurry and said evaporated remaining effluent;
   (d) subjecting said mixture to a lactic acid fermentation; and
   (e) evaporating said fermented mixture to a dry material content of 45 to 55 wt %.

2. A method as claimed in claim 1, further comprising the step of adding dry vegetable by-products to the evaporated fermented mixture.

3. A method as claimed in claim 2, wherein dry vegetable by-products are added to the evaporated fermented mixture until the dry material content is 64 to 72 wt %.

4. A method as claimed in claim 3, further comprising the step of drying the obtained product until the dry material content is between 88 and 92 wt %.

5. A method as claimed in claim 1, further comprising the step of drying the evaporated fermented mixture.

6. A method as claimed in claim 1, wherein the evaporated remaining effluent is hydrolyzed prior to step (c).

7. A method as claimed in claim 1, wherein said hydrolysis includes an acidification to a pH of approximately 1.7 and a liquefaction at a temperature between 140° and 160° C.

8. A method as claimed in claim 1, wherein said hydrolysis is an enzymatic hydrolysis.

9. A method as claimed in claim 1, wherein the acid obtained during lactic acid fermentation step (d) is neutralized.

10. A method as claimed in claim 1, wherein step (d) is performed for at least one hour under microaerophilic conditions and at a temperature between 30° and 60° C.

11. A method as claimed in claim 10, wherein step (d) is performed for 4 to 48 hours at 45° to 55° C.

12. A base material for cattle feed produced by the method of claim 1 which comprises:
   dry vegetable waste products and, calculated as a percentage of the dry material, at least 1 wt. % lactic acid and 10 to 15 wt. % mono-di- and trissaccharides, and wherein the in vitro digestability on the dry material is at least 68%.

13. A method of manufacturing a base material for cattle feed starting from a feed slurry and an effluent obtained in a wheat starch preparation process, which comprises the steps of:
   (a) subjecting the effluent to a thermal treatment in which resident proteins coagulate, high protein solid components are removed and the remaining effluent is evaporated to produce an evaporated remaining effluent;
   (b) subjecting the evaporated remaining effluent to a lactic acid fermentation;
   (c) hydrolyzing the feed slurry;
   (d) preparing a mixture from said hydrolyzed feed slurry and said fermented evaporated remaining effluent; and
   (e) evaporating said mixture to a dry material content of 45 to 55 wt %.

14. A method as claimed in claim 13, further comprising the step of adding dry vegetable by-products to the evaporated mixture.

15. A method as claimed in claim 14, wherein dry vegetable by-products are added to the evaporated mixture until the dry material content is 64 to 72 wt %.

16. A method as claimed in claim 15, further comprising the step of drying the obtained product until the dry material content is between 88 and 92 wt %.

17. A method as claimed in claim 13, further comprising the step of drying the evaporated mixture.

18. A method as claimed in claim 13, wherein the evaporated remaining effluent is hydrolyzed prior to step (b).

19. A method as claimed in claim 13, wherein said hydrolysis includes an acidification to a pH of approximately 1.7 and a liquefaction at a temperature between 140° and 160° C.

20. A method as claimed in claim 13, wherein the acid obtained during lactic acid fermentation step (b) is neutralized.

21. A method as claimed in claim 13, wherein step (b) is performed for at least one hour under microaerophilic conditions and at a temperature between 30° and 60° C.

22. A method as claimed in claim 21, wherein step (b) is performed for 4 to 48 hours at 45° to 55° C.

23. A base material for cattle feed produced by the method of claim 13 which comprises:
dry vegetables waste products and, calculated as a percentage of the dry material, at least 1 wt. % lactic acid and 10 to 15 wt. % mono-di- and trissaccharides, wherein the in vitro digestibility on dry material is at least 68%.

* * * * *